United States Patent Office 3,371,089
Patented Feb. 27, 1968

3,371,089
BIS-TRIAZINYLAMINO-STILBENE SULPHONIC
ACID COMPOUNDS
Heinrich Gold, Cologne-Stammheim, Erich Lehmann,
Burscheid, and Werner Theuer, Leverkusen, Germany,
assignors to Farbenfabriken Bayer Aktiengesellschaft,
Leverkusen, Germany, a German corporation
No Drawing. Filed July 28, 1964, Ser. No. 385,776
Claims priority, application Germany, Aug. 10, 1963,
F 40,468
6 Claims. (Cl. 260—240)

The present invention relates to bis-triazinylamino-stilbene disulphonic acid compounds; more particularly it concerns bis-triazinylamino-stilbene disulphonic acid compounds of the general formula

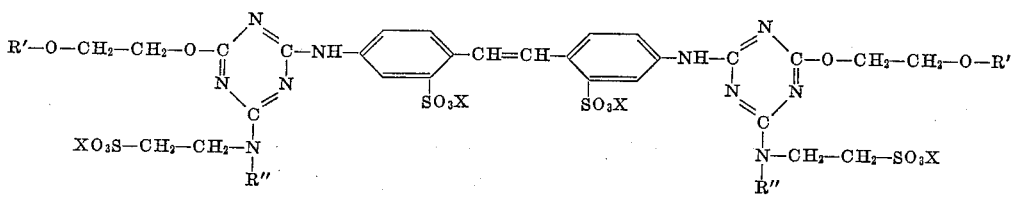

In this formula R' stands for an alkyl radical containing 1 to 4 carbon atoms, and R" represents hydrogen or an alkyl radical also containing 1 to 4 carbon atoms, while X stands for hydrogen or the equivalent of a cation.

The bis-triazinylamino-stilbene disulphonic acid compounds of the present invention can be obtained by condensing in known manner and in any sequence two mols of cyanuric chloride with one mol of 4,4'-diaminostilbene-2,2'-disulphonic acid, with two mols of a 2-alkoxy ethanol and with two mols of an optionally N-alkylated 2-aminoethane sulphonic acid and then optionally transforming the condensation products into salts, e.g. into the alkali metal or ammonium salts. Examples of 2-alkoxy ethanols are 2-methoxy, 2-ethoxy, 2-propoxy and 2-butoxy ethanols; examples of the optionally N-alkylated 2-aminoethane sulphonic acids are 2-methylamino, 2-ethylamino, 2-propylamino- and 2-butylamino ethane sulphonic acids.

The bis-triazinylamino-stilbene compounds of the invention are very useful compounds. In particular, they can be used as brightening agents, for instance for brightening textiles, especially textiles of wool and of synthetic polyamides. The brightening effect attained possesses good wet- and light-fastnesses and is distinguished by a high brilliance. The bis-triazinylamino-stilbene compounds of the present invention are further outstandingly suitable for the brightening of acid-treated paper. The quantities of the compounds required for the individual brightening purposes may be readily determined by preliminary experiments and the application of the compounds as brightening agents can be performed in the usual manner.

The following examples serve to illustrate the invention without, however, limiting its scope; the parts given are parts by weight.

Example 1

300 parts of crushed ice and 150 parts of water are added to a solution of 37 parts of cyanuric chloride in 300 parts of acetone and the cyanuric chloride suspension thus obtained is treated with a solution of 41.4 parts of the disodium salt of 4,4'-diaminostilbene-2,2'-disulphonic acid in 400 parts of water at a temperature of at most 5° C. The reaction solution is then adjusted to neutrality by the addition of an approximately 20 percent soda solution. As soon as the pH value no longer alters, the solution is treated with 32.5 parts of the sodium salt of β-N-methylaminoethane sulphonic acid in the form of a 25 to 30 percent aqueous solution, heated at 38–40° C. for two to three hours and then neutralised with a soda solution. The tetrasodium salt of 4,4'-bis-(2-(N-methylaminoethane sulphonic acid)-4-chloro-1,3,5-triazinyl-(6))-amino)-stilbene-2,2'-disulphonic acid thus formed is salted out by the addition of 500 parts of a saturated common salt solution, filtered off with suction and dried in vacuum at 30 to 40° C. 48 parts of this salt are then added to a solution which was obtained by dissolving 2.3 parts of metallic sodium in 250 parts of glycol monomethyl ether. The mixture is heated at 100 to 105° C. for four hours, then poured into 500 parts of water and treated at room temperature with 80 parts of common salt. The precipitate is filtered off with suction and dried. The bis-triazinylamino-stilbene compound thus obtained corresponds to the formula

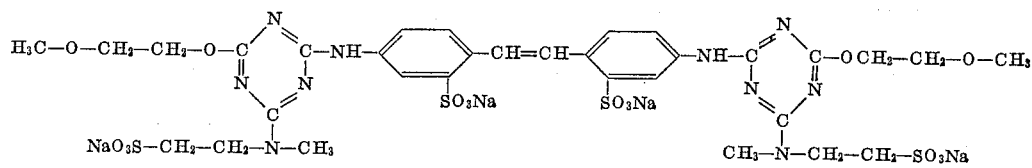

If instead of glycol monomethylether an equivalent amount of glycolmonoethyl ether or glycolmonopropyl ether is used or if for the β-N-methylaminoethane sulphonic acid an equivalent amount of β-N-butylaminoethane sulphonic acid is substituted the following bis-triazinylamino-stilbene compounds can be obtained in an analogous manner.

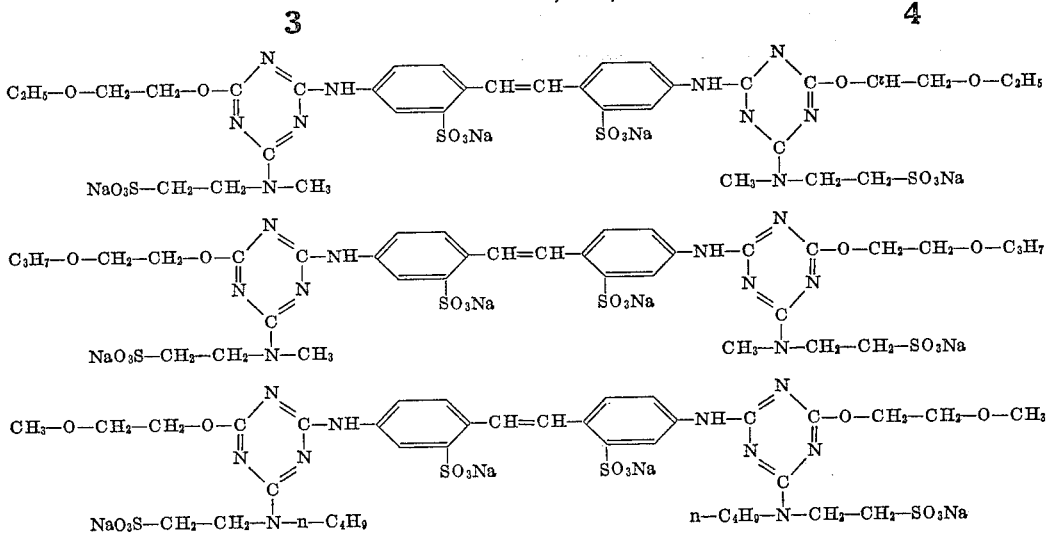

A paper produced in the usual manner at pH 4.3 from bleached sulphite cellulose with the addition of 15 percent china clay, 2 percent resin size, and 4 percent aluminium sulphate, is coated in a coating apparatus, e.g., in a glue press, with an aqueous solution which contains per litre 3 grams of the first mentioned bis-triazinylamino-stilbene compound as brightening agent so that the liquid take up of the paper amounts to 10 to 50 grams of solution per square metre of surface. The paper is subsequently dried at 80 to 100° C. and then shows an outstanding brightening effect.

A similar brightening effect is obtained if one of the others aforesaid bis-triazinylamino-stilbene compounds is used as brightening agent.

*Example 2*

A solution of 185 parts of cyanuric chloride in 1000 parts of glycol monomethyl ether is treated with 168 parts of sodium bicarbonate and heated with good stirring to about 32° C. The carbon dioxide evolved by the reaction is passed through a gas meter and measured. As soon as about 23 litres of carbon dioxide have been released, the solution is cooled to room temperature. A solution of 186 parts of the disodium salt of 4,4'-diaminostilbene-2,2'-disulphonic acid in 1400 parts of water are then added within 15 minutes, whereby the temperature rises to 34 to 36° C. After about half an hour's reaction time, the pH value of the reaction solution is adjusted to 6.9 to 7.0 by the addition of about 25 parts of a 20 percent soda solution. A solution of 150 parts of the sodium salt of β-aminoethane sulphonic acid in 500 parts of water is then added and the reaction mixture is heated at 96 to 98° C. for two hours. After cooling to room temperature, the bis-triazinylamino-stilbene compound of the formula

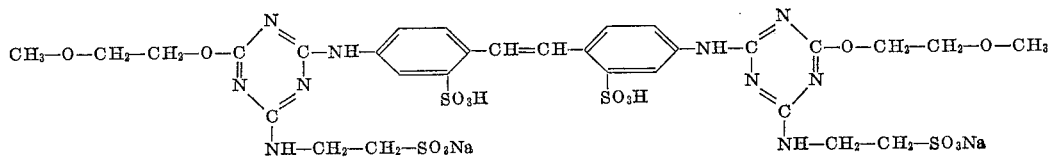

is salted out by addition of 300 parts of common salt, then filtered off with suction and dried.

A fabric from a polycondensate of ε-caprolactam is treated for 30 minutes at 80 to 90° C. at a liquor-to-goods ratio of 40:1 with an aqueous bath which contains per litre 0.1 gram of the bis-triazinylamino stilbene compound mentioned above. The fabric is then rinsed with cold water and dried in air. The fabric thus treated possesses an outstanding degree of whiteness.

We claim:
1. A bis-triazinylamino-stilbene disulphonic acid compound of the formula

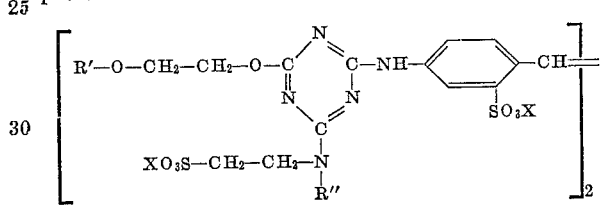

in which R' is alkyl containing 1–4 carbon atoms, R'' is hydrogen or alkyl containing 1–4 carbon atoms, and X is hydrogen, an alkali metal or ammonium moiety.

2. A compound of the formula

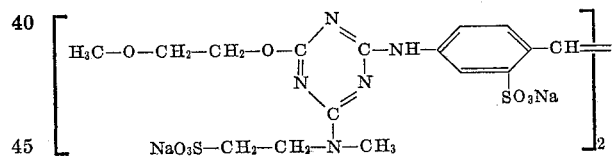

3. A compound of the formula

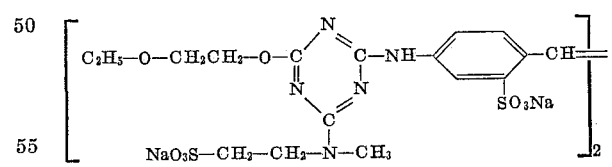

4. A compound of the formula

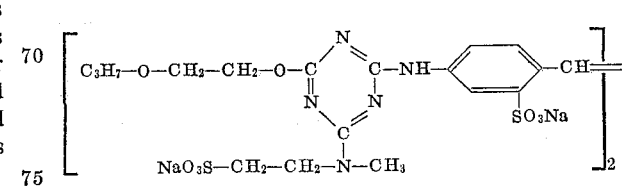

5. A compound of the formula
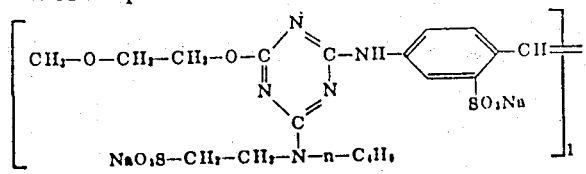
6. A compound of the formula
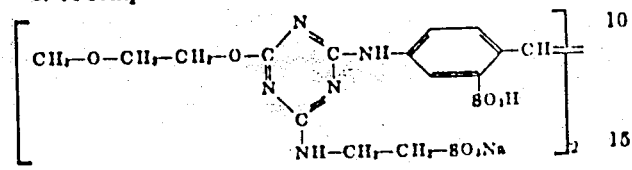
References Cited
FOREIGN PATENTS
| | | |
|---|---|---|
| 43,527 | 9/1960 | Poland. |
| 528,443 | 7/1956 | Canada. |
| 562,427 | 5/1958 | Belgium. |
JOHN D. RANDOLPH, *Primary Examiner.*